(12) United States Patent
Espargillière et al.

(10) Patent No.: US 7,005,396 B2
(45) Date of Patent: *Feb. 28, 2006

(54) ENAMEL COMPOSITION

(75) Inventors: Sophie Espargillière, Saint Dizier (FR); Andreas Schanné, Hessheim (DE); Francois Roques, Viltry le François (FR)

(73) Assignee: Ferro France-S.A.R.L., Saint Dizier, Cedex (FR)

( * ) Notice: Subject to any disclaimer, the term of this patent is extended or adjusted under 35 U.S.C. 154(b) by 226 days.

This patent is subject to a terminal disclaimer.

(21) Appl. No.: 10/311,182

(22) PCT Filed: Jun. 25, 2001

(86) PCT No.: PCT/EP01/07222
§ 371 (c)(1),
(2), (4) Date: Jun. 27, 2003

(87) PCT Pub. No.: WO02/02471
PCT Pub. Date: Jan. 10, 2002

(65) Prior Publication Data
US 2005/0014625 A1    Jan. 20, 2005

(30) Foreign Application Priority Data
Jun. 28, 2000 (EP) .................. 00113687

(51) Int. Cl.
C03C 8/08 (2006.01)
C03C 8/22 (2006.01)
C03C 3/17 (2006.01)
C03C 3/19 (2006.01)

(52) U.S. Cl. .............. 501/24; 501/16; 501/46; 501/47; 501/48; 501/77; 501/79

(58) Field of Classification Search .......... 501/16, 501/45–48, 73, 77, 79, 24, 26
See application file for complete search history.

(56) References Cited

U.S. PATENT DOCUMENTS

| 2,576,916 A | * | 12/1951 | Beals et al. | ........... 501/24 |
| 2,866,713 A | | 12/1958 | Allen | |
| 4,084,975 A | | 4/1978 | Faust | |
| 6,566,289 B1 | * | 5/2003 | Aronica et al. | ........... 501/24 |

FOREIGN PATENT DOCUMENTS

| EP | 0453897 | * | 10/1991 |
| EP | 1167310 A1 | | 1/2002 |
| GB | 697827 | * | 10/1953 |
| GB | 718132 | * | 11/1954 |
| GB | 894328 | * | 4/1962 |
| JP | 6128104 | * | 11/1986 |
| JP | 03083836 | * | 9/1991 |

* cited by examiner

Primary Examiner—Karl Group
(74) Attorney, Agent, or Firm—Rankin, Hill, Porter & Clark LLO

(57) ABSTRACT

The present invention provides a composition for use in forming an enamel cover coat from which baked-on foods can be removed without the need for pyrolysis or highly alkaline cleaners. The enamel cover coat preferably exhibits no chipping or other surface defects subsequent to a 2.0 mm Plum Jam Test and an acid resistance of A or better according to ISO 2722. The composition according to the invention includes a glass component including at least a first glass frit comprising a low $SiO_2$ glass frit. Preferably, the glass component includes a blend of the first glass frit and at least a second glass frit. Preferably, the first glass frit includes by weight from about 30% to about 45% $P_2O_5$, from about 20% to about 40% $Al_2O_3$, from about 15% to about 35% $Li_2O+Na_2O+K_2O$, up to about 15% $B_2O_3$, up to about 15% $MgO+CaO+SrO+BaO+ZnO$, up to about 10% $TiO_2+ZrO_2$, and up to about 10% $SiO_2$.

19 Claims, No Drawings

ENAMEL COMPOSITION

FIELD OF INVENTION

The present invention provides an enamel composition. More particularly, the present invention provides a composition for use in forming an acid and chip resistant enamel cover coat from which baked-on foods can be removed without the need for pyrolysis or highly alkaline cleaners.

BACKGROUND OF THE INVENTION

An oven can be one of the most difficult kitchen appliances to clean. Food that splatters onto the interior surfaces of the oven during cooking usually becomes baked-on, making the removal thereof particularly difficult. If the oven is not cleaned often, the amount of baked-on food can build up rapidly, thereby increasing the cleaning difficulty.

There are several known methods for facilitating the removal of baked-on food from the interior surfaces of ovens. The most widely used methods involve pyrolysis or the application of highly alkaline chemical oven cleaners. Although these known methods are relatively effective for removing baked-on food from the interior surfaces of ovens, they present several disadvantages.

Many ovens feature a high-temperature "self-cleaning" cycle during which baked-on foods are pyrolyzed (i.e., decomposed) to carbon ash residue that can be wiped from the interior surfaces of the oven once it cools. To be effective, such pyrolytic heating cycles must maintain the temperature within the oven cavity above about 480° C. (900° F.) for a period of approximately 60 minutes.

One of the disadvantages of using pyrolysis to remove baked-on food from the interior surfaces of ovens is the tendency for the porcelain enamels applied to the interior surfaces of ovens to craze and in some cases flake off when they are repeatedly exposed to such elevated temperatures. Moreover, ovens having pyrolytic heating cycles are more expensive to manufacture than conventional ovens due to the need for extra insulation. Furthermore, such ovens are more expensive to operate than conventional ovens because of the power consumed to generate and maintain the high temperatures during the pyrolytic heating cycle. Such ovens can also present safety concerns because the exterior surfaces of the oven can become quite hot during the pyrolytic heating cycle.

Another method for facilitating the removal of baked-on food from the interior surfaces of ovens involves the use of "catalytic" enamel compositions such as the composition disclosed in Faust, U.S. Pat. No. 4,084,975. Catalytic enamel compositions such as disclosed in Faust that have been fired on the interior surfaces of ovens have a porous texture and contain a substantial quantity of metallic oxides that can catalyze the oxidation of food material that is spilled or spattered on the surface of the enamel. In operation, food material is absorbed into the porous enamel surface where the catalytic metallic oxides catalyze oxidation of the food material at a substantially lower temperature than is required for pyrolytic enamels.

One of the disadvantages of the use of catalytic enamels on the interior surfaces of ovens is that the pores in the enamel can rapidly become saturated and clogged with food material, which significantly diminishes the ease with which the enamel can be cleaned. Furthermore, because the surface of a catalytic enamel coating is porous, it is readily subject to staining.

The other widely used method for removing baked-on food from the interior surfaces of ovens involves the use of highly alkaline chemical oven cleaners. Most oven cleaners of this type include significant quantities of caustics, such as sodium hydroxide and/or potassium hydroxide. While such products are relatively effective in their ability to remove baked-on food from the interior surfaces of ovens, they are highly alkaline (pH typically greater than about 12) and therefore present safety hazards. Fumes from such products, which are best used when the oven is warm, can irritate the eyes and throat and can also cause chemical skin burns. Moreover, the resulting product of the chemical reaction between these cleaners and baked-on food is unpleasant to handle.

There exists a need for a composition that can be applied to the interior surfaces of oven cavities and other articles from which baked-on foods can be removed without the need for pyrolysis or highly alkaline cleaners.

SUMMARY OF INVENTION

The present invention provides a composition for use in forming an enamel cover coat from which baked-on foods can be removed without the need for pyrolysis or highly alkaline cleaners. Preferably, the enamel cover coat produced using the composition according to the invention exhibits no chipping or other surface defects subsequent to a 2.0 mm Plum Jam Test and has an acid resistance of A or better according to ISO 2722.

The composition according to the invention comprises a glass component comprising at least a first glass frit. Preferably, the glass component comprises a blend of at least a first glass frit and a second glass frit. Preferably, the first glass frit includes by weight from about 30% to about 45% $P_2O_5$, from about 20% to about 40% $Al_2O_3$, from about 15% to about 35% $Li_2O+Na_2O+K_2O$, up to about 15% $B_2O_3$, up to about 15% $MgO+CaO+SrO+BaO+ZnO$, up to about 10% $TiO_2+ZrO_2$, and up to about 10% $SiO_2$. In the most preferred embodiment, the first glass frit comprises by weight about 37.25% $P_2O_5$, about 31.67% $Al_2O_3$, about 12.42% $K_2O$, about 11.16% $Na_2O$, about 3.78% $B_2O_3$, about 1.96% $TiO_2$, about 1.76% ZnO, and about 0.00% $SiO_2$.

The present invention also provides a method of forming an enamel cover coat on a substrate from which baked-on foods can be removed without the need for pyrolysis or highly alkaline cleaners. The method according to the invention comprises providing a substrate; providing a composition comprising a glass component comprising at least a first glass frit comprising a low $SiO_2$ glass frit; applying said composition to said substrate; and firing said composition to form said enamel cover coat. The method according to the invention can be used to produce an enamel cover coat that has an acid resistance of A or better according to ISO 2722 and that exhibits no chipping or other surface defects subsequent to a 2.0 mm Plum Jam Test.

The foregoing and other features of the invention are hereinafter more fully described and particularly pointed out in the claims, the following description setting forth in detail certain illustrative embodiments of the invention, these being indicative, however, of but a few of the various ways in which the principles of the present invention may be employed.

DETAILED DESCRIPTION OF PREFERRED EMBODIMENTS

The enamel cover coat composition according to the present invention comprises a glass component comprising at least a first glass frit. Preferably, the glass component comprises a blend of at least two glass frits. The first glass frit must be a low $SiO_2$ glass frit. As used in the specification and in the appended claims, the term "low $SiO_2$ glass frit" should be understood as meaning the total amount of $SiO_2$ smelted into the glass frit should be less than about 10% by weight, more preferably less than about 4%, and most preferably 0.00%. The optional second glass frit and any other glass frits further comprising the glass component can any one or a combination of conventional refractory glass frits such as, for example, the glass frits sold by Ferro Corporation under the trade designations GL5, T1568, T394, 709, M488, 7001, and 011-71-7004.

The low $SiO_2$ glass frit preferably comprises by weight from about 30% to about 45% $P_2O_5$, from about 20% to about 40% $Al_2O_3$, from about 15% to about 35% $Li_2O+Na_2O+K_2O$, up to about 15% $B_2O_3$, up to about 15% $MgO+CaO+SrO+BaO+ZnO$, up to about 10% $TiO_2+ZrO_2$, and up to about 10% $SiO_2$. More preferably, the low $SiO_2$ glass frit comprises by weight from about 35% to about 40% $P_2O_5$, from about 25% to about 35% $Al_2O_3$, from about 20% to about 30% $Li_2O+Na_2O+K_2O$, up to about 10% $B_2O_3$, up to about 7% $MgO+CaO+SrO+BaO+ZnO$, up to about 7% $TiO_2+ZrO_2$, and up to about 4% $SiO_2$. The low $SiO_2$ glass frit can further comprise by weight up to about 10%, and more preferably up to about 5%, $MnO+CoO+NiO+CuO+Fe_2O_3+CrO_3+MoO_3+WO_3$.

The currently most preferred and optimal ranges for the composition of the low $SiO_2$ glass frit in weight percent is shown below:

| Oxide | Most Preferred Range | Optimal Range |
| --- | --- | --- |
| $P_2O_5$ | 35.57–39.57 | 37.25 |
| $Al_2O_3$ | 30.00–34.00 | 31.67 |
| $K_2O$ | 10.00–14.00 | 12.42 |
| $Na_2O$ | 10.00–13.00 | 11.16 |
| $B_2O_3$ | 2.00–5.00 | 3.78 |
| $TiO_2$ | 0.00–3.00 | 1.96 |
| ZnO | 0.00–3.00 | 1.76 |
| $SiO_2$ | 0.00–1.00 | 0.00 |

The low $SiO_2$ glass frit may be prepared utilizing conventional glass melting techniques. A conventional ceramic refractory, fused silica, or platinum crucible may be used to prepare the low $SiO_2$ glass frit. Typically, selected oxides are smelted at temperatures of from about 1200° C. to about 1450° C. for about 30 to 40 minutes. The molten glass formed in the crucible is then converted to glass frit using water-cooled steel rollers or water quenching. It will be appreciated that the step of producing the low $SiO_2$ glass frit is not per se critical and any of the various techniques well-known to those skilled in the art can be employed.

The low $SiO_2$ glass frit can comprise up to about 100% by weight of the glass component. More preferably, however, the low $SiO_2$ glass frit comprises from about 20% to about 90% by weight of the glass component, with the balance of the glass component comprising one or more additional glass frits. In the presently most preferred embodiment of the invention, the low $SiO_2$ glass frit comprises from about 50% to about 75% by weight of the glass component, with the balance of the glass component comprising at least a second glass frit.

The glass frits comprising the glass component of the composition according to the invention are preferably milled prior to application. Any of the conventional milling techniques can be employed. Milling fineness is not per se critical, but a fineness of about 2 $cm^3$ being retained from a 50 $cm^3$ sample using a 200 mesh sieve is presently considered optimal.

It will be appreciated that the composition according to the invention can further comprise up to about 20% by weight of one or more mill additions. Suitable mill additions include, for example, clay, bentonite, magnesium carbonate, potassium nitrate, sodium aluminate, boric acid, and pigments. Inorganic materials, such as zirconia, alumina, alumina metaphosphate, spodumene, and feldspar, can also be added to the composition in order to modify the texture and/or to adjust the roughness of the fired enamel.

The surface texture of the fired enamel cover coat is generally low gloss and slightly rough, yet still glassy and non-porous. The low $SiO_2$ glass frit, if fired by itself, will generally produce a high gloss surface. The low gloss and slightly rough surface texture of the fired enamel cover coat according to the invention is believed to be a consequence of the interaction between the low $SiO_2$ glass frit, which is relatively soft, and the other glass frits, which tend to be relatively harder. It has been determined that the addition of refractory mill added inorganic materials, such as $ZrO_2$ and/or $Al_2O_3$ for example, can also lead to a slightly rougher surface texture, which can further improve the ease with which the fired enamel cover coat can be cleaned.

The composition according to the invention is intended for use as a cover coat. It can be applied like any of the known cover coat enamels for use on sheet steel. For example, it can applied directly onto pickled, nickel-coated steel. It can be applied over fired enamel ground coated substrates. And, it can be applied over unfired ground coats using any of the well-known two-coat/one-fire processes (e.g., wet/wet, wet/dry, and dry/dry).

The composition according to the present invention can be applied by any of the known wet application processes such as spraying, dipping, flow coating, and electrodeposition. Preferably, the composition is dried prior to firing when it is applied using a wet application process. Drying is typically accomplished using heating lamps. The drying time and temperature is not per se critical. The application rate of the composition by wet application processes will vary depending upon the desired thickness of the resulting fired enamel cover coat. For example, a fired enamel cover coat having a thickness of about 140 μm can be obtained when the application rate of the wet enamel composition is about 400 $g/m^2$.

The enamel composition can also be applied using conventional dry electrostatic application processes. In such instances, an organopolysiloxane is typically added to the composition to facilitate electrostatic application. The application rate of the composition by dry electrostatic processes will vary widely according to the desired thickness of the resultant enamel cover coat. Typical application rates are from about 200 $g/m^2$ to about 600 $g/m^2$.

The composition according to the present invention is typically fired at a temperature of from about 770° C. to about 870° C. for about 2 to about 8 minutes. More preferably, the composition is fired at a temperature of from about 800° C. to about 850° C. for about 3 to about 6 minutes. The optimal firing conditions are 820° C. for about 3.5 minutes. It will be appreciated that firing times and temperatures are not per se critical, and a range of firing schedules could be used.

Upon firing, the composition according to the present invention forms an enamel cover coat from which baked-on foods can be removed without the need for pyrolysis or highly alkaline cleaners. The enamel composition according to the invention is particularly well-suited for application on the interior surfaces of oven cavities, dripping pans, cookware, and other articles that are exposed to the risk of baked-on food soiling. The fired enamel cover coat can be produced in a wide range of colors, including bright colors such as blue and green, simply by varying the pigments included as mill additions.

The fired cover coat enamel according to the invention is scratch resistant, stain resistant, and maintains its easy-to-clean properties over many heating cycles. In addition, baked-on food can be easily removed from the fired cover coat enamel without the need for high temperature heating cycles or highly alkaline chemical cleaners. Most baked-on foods can be removed from the fired enamel cover coat using warm water. The fired cover coat enamel preferably exhibits an acid resistance of A or better according to ISO 2722, no chipping or other surface defects subsequent to a 2.0 mm Plum Jam Test, and acceptable scores on the Modified FAN Test. The testing methods are described below:

Plum Jam Test

In order to objectively compare the ease from which baked-on food can be removed from fired enamel cover coats, Ferro Corporation developed the "Plum Jam Test." According to the Plum Jam Test, two foods, being plum jam and olive oil, are each separately applied cold to the surface of cold cover coat enameled coupons made of enameling grade steel (carbon content about 0.05%) having the following dimension 13 cm×16 cm×1 mm. The olive oil used in the test is not critical. Any food grade olive oil can be used. However, it has been determined that various factors such as the pH, sugar content, and water content of the plum jam used in the test can influence the results of the test. Accordingly, it is important that the plum jam used in the test be a plum jam sold as Aachener Pflümli-Pflaumenmus, which is sold by Zentis of Germany, or a plum jam having the same performance characteristics as this plum jam.

The olive oil is applied dropwise to the coupons, and the plum jam is applied at a thickness of 900 $\mu$m and 2 mm, respectively, using a brush. The coupons are then heated to a temperature of 280° C. for 30 minutes to bake the foods onto the coupon. After heating, the coupons are allowed to cool to room temperature. Once cooled, the coupons are soaked for 5 minutes in 60° C. water containing 15 ml of ordinary household liquid washing detergent per 5L of water. After soaking, the coupons are evaluated to determine the ease with which baked-on food could be removed using a dry cloth and a two-sided common household cleaning sponge having both a soft side and an abrasive side according to the following scoring system, where a score of 5 is considered best:

| Step | Cleaning Method | Score |
| --- | --- | --- |
| 1 | Surface of coupon completely cleaned by wiping with a dry cloth. | 5 |
| 2 | Surface of coupon completely cleaned by wiping with the soft side of a sponge and soaking solution. | 4 |
| 3 | Surface of coupon completely cleaned by wiping with the abrasive side of a sponge and soaking solution. | 3 |
| 4 | Surface of coupon completely cleaned by wiping with the soft side of a sponge and liquid abrasive cleaner. | 2 |
| 5 | Surface of coupon can only be cleaned, if at all, by wiping with the abrasive side sponge and liquid abrasive cleaner. | 1 |

Following the cleaning and scoring step, each coupon is evaluated for surface defects such as chipping or marking.

Modified FAN Test

A second test used to objectively measure the ease with which baked-on food can be removed from an enamel cover coat is the "Modified FAN Test". The letters "FAN" are an abbreviation of the French phrase facile a nettoyer, which translates to English as "easy-to-clean." In the Modified FAN Test, stainless steel retaining rings are adhered to the surface of cover coat enameled coupons using a high thermal resistance silicone sealing compound. 1 g. samples of the following foods are then separately applied within the stainless steel retaining rings cold to the surface of cover coat enameled coupons: ketchup; lemon juice; salted milk; egg yolk; and gravy. The coupons are then placed in an air convection oven at a temperature of about 250° C. for 30 minutes. The coupons are then removed from the oven and allowed to cool to room temperature. The stainless steel rings and polymerized silicone sealant are peeled off the coupons. The coupons are then soaked for 5 minutes in 60° C. water containing 15 ml of ordinary household liquid washing detergent per 5L of water.

After soaking, the coupons are evaluated to determine the ease with which baked-on food can be removed. Each coupon is wiped 3 times with a two-sided common household cleaning sponge having both a soft side and an abrasive side (each wipe involves moving the sponge across the test area and then back over the test area) and scored according to the following system, where a score of 5 is considered best:

| Step | Cleaning Method | Pressure | Score |
| --- | --- | --- | --- |
| 1 | Surface of coupon completely cleaned by wiping with abrasive side of sponge. | 1 kg | 5 |
| 2 | Surface of coupon completely cleaned by wiping with abrasive side of sponge. | 3 kg | 4 |
| 3 | Surface of coupon completely cleaned by wiping with abrasive side of sponge. | 6 kg | 3 |
| 4 | Surface of coupon completely cleaned by wiping with abrasive side of sponge and more detergent. | 6 kg | 2 |
| 5 | Same as step 4, but residue remains. | 6 kg | 1 |

The following examples are intended only to illustrate the invention and should not be construed as imposing limitations upon the claims.

EXAMPLE 1

A low $SiO_2$ glass frit was prepared by smelting selected oxides in a smelting pot at about 1220–1270° C. for about 40 minutes and converting the molten glass to frit using water cooled rollers. The low $SiO_2$ glass frit had the following composition:

| Component | Wt. % |
|---|---|
| $P_2O_5$ | 37.25 |
| $Al_2O_3$ | 31.67 |
| $K_2O$ | 12.42 |
| $B_2O_3$ | 3.78 |
| $Na_2O$ | 11.16 |
| $TiO_2$ | 1.96 |
| ZnO | 1.76 |
| $SiO_2$ | 0 |

A wet enamel cover coat composition was formed using the low $SiO_2$ glass frit by wet milling the following ingredients to a fineness of 2 cm³ being retained from a 50 cm³ sample on a 200 mesh sieve:

| Ingredient | Grams |
|---|---|
| Low $SiO_2$ glass frit | 50 |
| Ferro Frit 011-71-7004 | 50 |
| Clay #2 | 5.5 |
| K27, a synthetic bentonite sold by Ferro Corporation | 0.1 |
| Potassium carbonate | 0.2 |
| Magnesium carbonate | 0.1 |
| Borax Decahydrate | 0.2 |
| Sodium nitrate | 0.3 |
| FK3162, an inorganic spinel type pigment sold by Ferro Corporation | 2 |
| K64, a course (~900 μm) corundum sold by Ferro Corporation | 4 |
| K101, an aluminum metaphosphate sold by Ferro Corporation | 2 |

After milling, the wet enamel cover coat composition was applied to 13 cm×16 cm×1 mm sheet steel coupons that had previously been coated with a conventional enamel ground coat. The wet enamel cover coat composition was applied using a spray gun at a rate of about 400 g/m². The wet enamel cover coat composition was dried using a heat lamp and then fired at about 820° C. for about 3.5 minutes producing an enamel cover coat having a thickness of about 140 μm subsequent to firing.

The enameled coupons were tested for acid resistance in accordance with ISO 2722 and for ease of baked-on food removal using the Modified FAN Test and the Plum Jam Test as previously described. The results of the testing are shown below:

| Test | Score |
|---|---|
| Acid Resistance | |
| ISO 2722 | AA |
| Modified FAN Test | |
| ketchup | 5 |
| lemon juice | 5 |
| salted milk | 3 |
| egg yolk | 5 |
| gravy | 5 |
| Plum Jam Test | |
| olive oil | 5 |
| plum jam (900 μm) | 5 |
| plum jam (2.0 mm) | 5 |

The enamel cover coat showed very good acid resistance, good cleanability, and no chipping or other surface defects subsequent to the 2.0 mm Plum Jam Test.

EXAMPLE 2

A dry enamel cover coat composition was formed using the low $SiO_2$ glass frit prepared according to Example 1, using the following ingredients:

| Ingredient | Grams |
|---|---|
| Low $SiO_2$ glass frit | 50 |
| Ferro Frit 011-71-7004 | 50 |
| FK3162, an inorganic spinel type pigment sold by Ferro Corporation | 2 |
| K64, a course (~900 μm) corundum sold by Ferro Corporation | 4 |
| K101, an aluminum metaphosphate sold by Ferro Corporation | 2 |

These ingredients and about 0.2% by weight of an organopolysiloxane were dry milled together in a ball mill to a fineness of 8.0%±2.0% residue being retained on a 325 mesh sieve as determined using ASTM Standard C285-88. The resulting powder had a bulk resistivity of about $5 \times 10^{15}$ ohm/cm to about $80 \times 10^{15}$ ohm/cm. After milling, the dry enamel cover coat composition was used for a two-coat/two-fire process and applied using a standard corona discharge gun at 50 kV to about 100 kV, on 13 cm×16 cm×1 mm sheet steel coupons that had previously been coated with a conventional enamel ground coat. The application rate of the dry enamel cover coat composition was about 400 g/m².

The coupons were then fired at about 850° C. for about 6 minutes, producing an enamel cover coat having a thickness of about 150 μm subsequent to firing. After cooling to room temperature, the coupons were tested for acid resistance and for ease of baked-on food removal using the Plum Jam Test. Results are reported below:

| Test | Score |
|---|---|
| Acid Resistance | |
| ISO 2722 | AA |
| Plum Jam Test | |
| olive oil | 5 |
| plum jam (2.0 mm) | 5 |

The cover coat enamel showed very good acid resistance, good cleanability, and no chipping or other surface defects subsequent to the 2.0 mm Plum Jam Test.

EXAMPLE 3

A dry enamel cover coat composition was formed using the ingredients according to Example 2. These ingredients and about 0.2% by weight of an organopolysiloxane were dry milled together in a ball mill to a fineness of 8.0%±2.0% residue being retained on a 325 mesh sieve as determined using ASTM Standard C285-88. The resulting powder had a bulk resistivity of about $5 \times 10^{15}$ ohm/cm to about $80 \times 10^{15}$ ohm/cm.

After milling, the composition was used for a two-coat/one-fire powder/powder process and applied using a standard corona discharge gun at 50 kV to about 100 kV, on 13 cm×16 cm×1 mm sheet steel coupons. These coupons had previously been applied with a commercial enamel ground coat sold by Ferro Corporation under the trade designation 076-78-9901 (the application rate of the ground coat was about 100–250 g/m$^2$ to obtain a fired thickness of about 40 μm to about 90 μm). The application rate of the dry enamel cover coat composition was about 250 to about 400 g/m$^2$ (to obtain a fired thickness of about 90 μm to about 150 μm).

The coupons were then fired at about 850° C. for about 6 minutes. After cooling to room temperature, the coupons were tested for acid resistance and for ease of baked-on food removal using the Plum Jam Test. Results are reported below:

| Test | Score |
|---|---|
| Acid Resistance | |
| ISO 2722 Plum Jam Test | AA |
| olive oil | 5 |
| plum jam (2.0 mm) | 5 |

The enamel cover coat showed very good acid resistance, good cleanability, and no chipping or other surface defects subsequent to the 2.0 mm Plum Jam Test.

Baked-on food is easily removed from the fired enamel cover coat according to the invention upon exposure to moist air for several hours. When the composition is applied to cookware and other submersible articles, baked-on food can be easily removed upon soaking the article in hot (60° C. or higher) water for about 10 minutes. Oven cavities can be cleaned by producing steam in the oven cavity or by applying hot water to the interior surfaces of the oven using a sponge.

The present invention also provides a method of forming an enamel cover coat from which baked-on foods can be removed without the need for pyrolysis or highly alkaline cleaners. The method comprises providing a substrate; providing a composition comprising a glass component comprising at least a first glass frit comprising a low SiO$_2$ glass frit; applying said composition to said substrate; and firing said composition to form said enamel cover coat. Preferably, the glass component comprises a blend of said first glass frit and at least a second glass frit. Moreover, said first glass frit preferably comprises by weight from about 30% to about 45% P$_2$O$_5$, from about 20% to about 40% Al$_2$O$_3$, from about 15% to about 35% Li$_2$O+Na$_2$O+K$_2$O, up to about 15% B$_2$O$_3$, up to about 15% MgO+CaO+SrO+BaO+ZnO, up to about 10% TiO$_2$+ZrO$_2$, and up to about 10% SiO$_2$. The enamel cover coat produced according to the method of the present invention preferably exhibits excellent acid resistance and no chipping or other surface defects subsequent to a 2.0 mm Plum Jam Test.

It will be appreciated that the method according to the invention can be used to apply an enamel cover coat to pickled nickel-coated steel, decarburized and non-decarburized steel, and fired and unfired ground coated substrates (by both 2 coat-2 fire and 2 coat–1 fire application processes).

The present invention is also directed to an article having at least one surface coated with an enamel cover coat from which baked-on foods can be removed without the need for pyrolysis or highly alkaline cleaners. The article can be, for example, an oven having the enamel cover coat applied to the interior surfaces of the oven cavity, dripping pans, and cookware such as pots and pans. The enamel cover coated surface of the article according to the invention preferably exhibits excellent acid resistance and no chipping or other surface defects subsequent to a 2.0 mm Plum Jam Test. The enamel cover coat is formed on the article according to the invention by application of an enamel cover coat composition to a surface of the article and then firing the enamel cover coat composition. The enamel cover coat composition comprises a glass component comprising at least a first glass frit comprising a low SiO$_2$ glass frit, and more preferably a blend of said first glass frit and at least a second glass frit. The first glass frit preferably comprises by weight from about 30% to about 45% P$_2$O$_5$, from about 20% to about 40% Al$_2$O$_3$, from about 15% to about 35% Li$_2$O+Na$_2$O+K$_2$O, up to about 15% B$_2$O$_3$; up to about 15% MgO+CaO+SrO+BaO+ZnO, up to about 10% TiO$_2$+ZrO$_2$, and up to about 10% SiO$_2$.

Additional advantages and modifications will readily occur to those skilled in the art. Therefore, the invention in its broader aspects is not limited to the specific details and illustrative examples shown and described herein. Accordingly, various modifications may be made without departing from the spirit or scope of the general inventive concept as defined by the appended claims and their equivalents.

What is claimed:

1. A composition for use in forming an enamel cover coat from which baked-on foods can be removed without the need for pyrolysis or highly alkaline cleaners, said composition comprising a glass component comprising at least a first glass frit, said first glass frit comprising by weight from about 35.57% to about 39.57% P$_2$O$_5$, from about 30.00% to about 34.00% Al$_2$O$_3$, from about 10.00% to about 14.00% K$_2$O, from about 10.00% to about 13.00% Na$_2$O, from about 2.00% to about 5.00% B$_2$O$_3$, up to about 3.00% ZnO, up to about 3.00% TiO$_2$, and up to about 1.00% SiO$_2$.

2. The composition according to claim 1 wherein said glass component comprises a blend of at least said first glass frit and a second glass frit.

3. The composition according to claim 2 wherein said enamel cover coat exhibits no chipping or other surface defects subsequent to a 2.0 mm Plum Jam Test.

4. The composition according to claim 3 wherein said enamel cover coat has an acid resistance of A or better according to ISO 2722.

5. The composition according to claim 3 wherein said first glass frit comprises by weight from about 20% to about 35% Li$_2$O+Na$_2$O+K$_2$O, up to about 15% MgO+CaO+SrO+BaO+ZnO, and up to about 10% TiO$_{2+ZrO2}$.

6. The composition according to claim 5 wherein said first glass frit further comprises by weight up to about 10% MnO+CoO+NiO+CuO+Fe$_2$O$_3$CrO$_3$+MoO$_{3+WO3}$.

7. The composition according to claim 5 wherein said first glass frit comprises by weight from about 20% to about 30%

$Li_2O+Na_2O+K_2O$, up to about 7% $MgO+CaO+SrO+BaO+ZnO$, and up to about 7% $TiO_2+ZrO_2$.

8. A composition according to claim 5 for use in forming an enamel cover coat from which baked-on foods can be removed without the need for pyrolysis or highly alkaline cleaners, said composition comprising a glass component comprising a blend of at least a first glass fnit and a second glass frit, wherein said first glass frit comprises by weight from about 35.57% to about 39.57% $P_2O_5$, from about 30.00% to about 34.00% $Al_2O_3$, from about 10.00% to about 14.00% $K_2O$, from about 10.00% to about 13.00% $Na_2O$, from about 20% to about 30% $Li_2O+Na_2O+K_2O$, from about 2.00% to about 5.00% $B_2O_3$, up to about 3.00% ZnO, up to about 7% $MgO+CaO+SrO+BaO+ZnO$, up to about 3.00% $TiO_2$, up to about 7% $TiO_2+ZrO_2$, and up to about 1.00% $SiO_2$, and wherein said enamel cover coat exhibits no chipping or other surface defects subsequent to a 2.0 mm Plum Jam Test.

9. The composition according to claim 8 wherein said first glass frit comprises by weight about 37.25% $P_2O_5$, about 31.67% $Al_2O_3$, about 12.42% $K_2O$, about 11.16% $Na_2O$, about 3.78% $B_2O_3$, about 1.96% $TiO_2$, about 1.76% ZnO, and about 0.00% $SiO_2$.

10. The composition according to claim 3 wherein said first glass frit comprises from about 20% to about 90% by weight of said glass component.

11. The composition according to claim 3 wherein said first glass frit comprises from about 50% to about 75% by weight of said glass component.

12. The composition according to claim 3 further comprising up to about 20% by weight of one or more mill additions.

13. The composition according to claim 12 wherein at least one of said mill additions is selected from the group consisting of clay, bentonite, magnesium carbonate, potassium nitrate, sodium aluminate, boric acid, and pigments.

14. A method of forming an enamel cover coat from which baked-on foods can be removed without the need for pyrolysis or highly alkaline cleaners, said method comprising: providing a substrate; providing a composition comprising a glass component, said glass component comprising at least a first glass frit, said first glass frit comprising by weight from about 35.57% to about 39.57% $P_2O_5$, from about 30.00% to about 34.00% $Al_2O_3$, from about 10.00% to about 14.00% $K_2O$, from about 10.00% to about 13.00% $Na_2O$, from about 2.00% to about 5.00% $B_2O_3$, up to about 3.00% ZnO, up to about 3.00% $TiO_2$, and up to about 1.00% $SiO_2$; applying said composition to said substrate; and firing said composition to form said enamel cover coat.

15. The method according to claim 14 wherein said glass component comprises a blend of at least said first glass frit and a second glass frit.

16. The method according to claim 15 wherein said enamel cover coat exhibits no chipping or other surface defects subsequent to a 2.0 mm Plum Jam Test.

17. The method according to claim 16 wherein said first glass fit comprises by weight from about 20% to about 35% $Li_2O+Na_2O+K_2O$, up to about 15% $MgO+CaO+SrO+BaO+ZnO$, and up to about 10% $TiO_2+ZrO_2$.

18. The method according to claim 16 wherein said substrate comprises pickled nickel-coated steel, fired enamel ground coated steel, or unfired enamel ground coated steel.

19. An article having at least one surface coated with an enamel cover coat from which baked-on foods can be removed without the need for pyrolysis or highly alkaline cleaners, said enamel cover coat having been formed by applying a composition to said surface of said article and then firing said composition, said composition comprising a glass component comprising at least a first glass frit, said first glass frit comprising by weight from about 35.57% to about 39.57% $P_2O_5$, from about 30.00% to about 34.00% $Al_2O_3$, from about 10.00% to about 14.00% $K_2O$, from about 10.00% to about 13.00% $Na_2O$, from about 2.00% to about 5.00% $B_2O_3$, up to about 3.00% ZnO, up to about 3.00% $TiO_2$, and up to about 1.00% $SiO_2$.

* * * * *